United States Patent Office.

A. M. JOHNSTON AND H. H. AVRIT, OF CLARKSVILLE, TENNESSEE.

Letters Patent No. 93,206, dated August 3, 1869.

IMPROVED HOG-CHOLERA REMEDY.

The Schedule referred to in these Letters Patent and making part of the same.

To whom it may concern:

Be it known that we, A. M. JOHNSTON, and H. H. AVRIT, of Clarksville, Montgomery county, State of Tennessee, have invented a new and valuable Medical Compound for the Cure of "Hog-Cholera," to be known as and named "Johnston and Avrit's Hog-Cholera Remedy;" and the following is a full and complete description of said combination and remedy.

It is composed under the following formula:

Take four ounces of extract of logwood; four ounces bluestone, (Sulphas cupri;) pure water, three quarts. Dissolve and make solution.

Then add to the solution, one and a half pint refined coal-oil; one and a half pint of linseed-oil; one and a half pint of spirits turpentine. Mix thoroughly.

Dose, one-half pint, to be given internally.

We claim, and desire to secure by Letters Patent, the exclusive right to same, under the patent laws of the United States, as our invention is the combination of the above ingredients and the proportions used.

A. M. JOHNSTON.
H. H. AVRIT.

Witnesses:
BRYCE STEWART,
T. W. KING.